United States Patent
Morikawa et al.

(10) Patent No.: US 9,316,505 B2
(45) Date of Patent: Apr. 19, 2016

(54) ANALYSIS METHOD, AND ANALYSIS APPARATUS

(71) Applicant: FUJITSU LIMITED, Kawasaki-shi, Kanagawa (JP)

(72) Inventors: Hiroaki Morikawa, Kawasaki (JP); Tatsuya Asai, Kawasaki (JP); Takashi Katoh, Yokohama (JP); Shinichiro Tago, Shinagawa (JP); Hiroya Inakoshi, Tama (JP)

(73) Assignee: FUJITSU LIMITED, Kawasaki (JP)

( * ) Notice: Subject to any disclaimer, the term of this patent is extended or adjusted under 35 U.S.C. 154(b) by 60 days.

(21) Appl. No.: 14/077,866

(22) Filed: Nov. 12, 2013

(65) Prior Publication Data

US 2014/0195144 A1    Jul. 10, 2014

(30) Foreign Application Priority Data

Jan. 10, 2013    (JP) .................................. 2013-002852

(51) Int. Cl.
| | |
|---|---|
| G01C 21/36 | (2006.01) |
| G06F 11/36 | (2006.01) |
| G01C 21/34 | (2006.01) |
| H04L 29/08 | (2006.01) |
| H04M 1/725 | (2006.01) |

(52) U.S. Cl.
CPC .......... G01C 21/3679 (2013.01); G01C 21/343 (2013.01); G06F 11/3656 (2013.01); H04L 67/306 (2013.01); H04M 1/72572 (2013.01)

(58) Field of Classification Search
CPC ....................... H04W 28/14; H04N 21/41407
USPC .......................... 701/400, 408, 409, 411, 413
See application file for complete search history.

(56) References Cited

U.S. PATENT DOCUMENTS

| | | | | |
|---|---|---|---|---|
| 8,560,722 | B2 * | 10/2013 | Gates ............... | H04N 21/41407 707/631 |
| 2002/0161627 | A1 * | 10/2002 | Gailey .............. | G06F 17/30867 186/35 |
| 2006/0041663 | A1 * | 2/2006 | Brown .................. | H04L 67/306 709/226 |

(Continued)

FOREIGN PATENT DOCUMENTS

| | | |
|---|---|---|
| JP | 2002-350147 | 12/2002 |
| JP | 2003-44512 | 2/2003 |

(Continued)

OTHER PUBLICATIONS

Y. Zheng et al., "Mining Interesting Locations and Travel Sequences from GPS Trajectories," Apr. 2009, 10 pages.

(Continued)

*Primary Examiner* — Thomas G Black
*Assistant Examiner* — Wae Louie
(74) *Attorney, Agent, or Firm* — Staas & Halsey LLP

(57) ABSTRACT

An analysis method executed by a computer, the analysis method includes: detecting a plurality of staying points where one or more mobile bodies stayed in accordance with a plurality of trace data associated with trajectories of the one or more mobile bodies; comparing, in accordance with the plurality of trace data, a first ending time of stay in a first staying point selected from among the plurality of staying points with second ending times of stay in one or more second staying points which are similar to the first staying point; and determining feature of the first staying point in accordance with a result of the comparison.

7 Claims, 15 Drawing Sheets

(56) References Cited

U.S. PATENT DOCUMENTS

| | | | |
|---|---|---|---|
| 2007/0171192 A1* | 7/2007 | Seo et al. | 345/156 |
| 2007/0288155 A1* | 12/2007 | Kaneda | G01C 21/343 |
| | | | 701/465 |
| 2009/0005969 A1* | 1/2009 | Tamura | 701/202 |
| 2009/0098888 A1* | 4/2009 | Yoon | H04M 1/72572 |
| | | | 455/456.2 |
| 2010/0036601 A1* | 2/2010 | Ozawa et al. | 701/201 |
| 2012/0158908 A1* | 6/2012 | Luna | H04W 28/14 |
| | | | 709/217 |
| 2012/0203732 A1* | 8/2012 | Oono | 706/59 |
| 2012/0239607 A1* | 9/2012 | Rao et al. | 706/58 |
| 2014/0026126 A1* | 1/2014 | Richter | G06F 11/3656 |
| | | | 717/128 |
| 2014/0195144 A1* | 7/2014 | Morikawa | G01C 21/3679 |
| | | | 701/400 |
| 2015/0012313 A1* | 1/2015 | Yoshioka | 705/6 |

FOREIGN PATENT DOCUMENTS

| | | |
|---|---|---|
| JP | 2011-128725 | 6/2011 |
| JP | 2011-154004 | 8/2011 |
| WO | 2008/149408 | 12/2008 |

OTHER PUBLICATIONS

Zhu et al., "Inferring Taxi Status Using Gps Trajectories," *Technical Report MR-TR-2011-144*, Nov. 2011, 13 pages.

Huo et al., "*You Can Walk Alone*: Trajectory Privacy-Preserving through Significant Stays Protection," 2012, pp. 351-356.

* cited by examiner

FIG. 4

| TIME | MOBILE BODY ID | LONGITUDE | LATITUDE |
|---|---|---|---|
| 2012/08/01 00:00:00 | m1 | 137.77 | 36.30 |
| 2012/08/01 00:00:01 | m2 | 138.03 | 35.78 |
| ⋮ | ⋮ | ⋮ | ⋮ |
| 2012/08/01 12:00:00 | m1 | 138.22 | 36.22 |
| ⋮ | ⋮ | ⋮ | ⋮ |
| 2012/08/01 19:30:00 | m1 | 137.78 | 36.31 |
| ⋮ | ⋮ | ⋮ | ⋮ |

FIG. 5

| MOBILE BODY ID | TRACE DATA |
|---|---|
| m1 | (36.30,137.77, 2012/08/01 00:00:00),...,(36.22,138.22, 2012/08/01 12:00:00),...,(36.31,137.78, 2012/08/01 19:30:00) |
| m2 | (35.78,138.03, 2012/08/01 00:00:01),... |
| ... | ... |

FIG. 8

| MOBILE BODY ID | LONGITUDE | LATITUDE | STARTING TIME | ENDING TIME |
|---|---|---|---|---|
| m1 | ... | ... | ... | ... |
| m1 | ... | ... | ... | ... |
| ⋮ | ⋮ | ⋮ | ⋮ | ⋮ |
| m2 | ... | ... | ... | ... |
| m2 | ... | ... | ... | ... |
| ⋮ | ⋮ | ⋮ | ⋮ | ⋮ |

FIG. 14

| LONGITUDE | LATITUDE | TYPE |
|---|---|---|
| ... | ... | TYPE 1 |
| ... | ... | ... |
| ... | ... | ... |
| ⋮ | ⋮ | ⋮ |

22

ANALYSIS METHOD, AND ANALYSIS APPARATUS

CROSS-REFERENCE TO RELATED APPLICATION

This application is based upon and claims the benefit of priority from the prior Japanese Patent Application No. 2013-002852 filed on Jan. 10, 2013, the entire contents of which are incorporated herein by reference.

FIELD

The embodiment discussed herein is related to a method and apparatus for analyzing a staying point, and a medium.

BACKGROUND

In general, a method for detecting a staying point by analyzing trace data based on history of Global Positioning System (GPS) data recorded by a device such as a GPS logger has been developed. Such method is disclosed in Japanese Laid-open Patent Publication No. 2011-154004 and Non-Patent Literatures 1 to 3, for example. Non-Patent Literature 1 is Yu Zheng, Lizhu Zhang, Xing Xie, Wei-Ying Ma, "Mining Interesting Locations and Travel Sequences from GPS Trajectories", WWW 2009, pp. 791 to 800. Non-Patent Literature 2 is Zheng Huo, Xiaofeng Meng, Haibo Hu, Yi Huang, "You Can Walk Alone: Trajectory Privacy-preserving through Significant Stays Protection", DASFAA (1) 2012, pp. 351 to 366. Non-Patent Literature 3 is Y. Zhu, Y. Zheng, L. Zhang, D. Santani, X. Xie, and Q. Yang, "Inferring Taxi Status Using GPS Trajectories", November 2011, Technical Report MSR-TR-2011-144.

SUMMARY

According to an aspect of the invention, an analysis method executed by a computer, the analysis method includes: detecting a plurality of staying points where one or more mobile bodies stayed in accordance with a plurality of trace data associated with trajectories of the one or more mobile bodies; comparing, in accordance with the plurality of trace data, a first ending time of stay in a first staying point selected from among the plurality of staying points with second ending times of stay in one or more second staying points which are similar to the first staying point; and determining feature of the first staying point in accordance with a result of the comparison.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an exemplary configuration of a GPS data storage unit;

FIG. 5 is a diagram illustrating exemplary trace data;

FIG. 8 is a diagram illustrating exemplary results of the detection of staying points;

FIG. 14 is a diagram illustrating an exemplary configuration of an analysis result storage unit.

DESCRIPTION OF EMBODIMENT

When a type of a place of a staying point detected by any of the methods of Non-Patent Literatures 1 to 3 is to be determined, a complicated procedure including matching with a map is performed.

Therefore, according to one aspect of the technique disclosed in this embodiment, simplified classification of types of staying points is aimed at.

Figure 1:
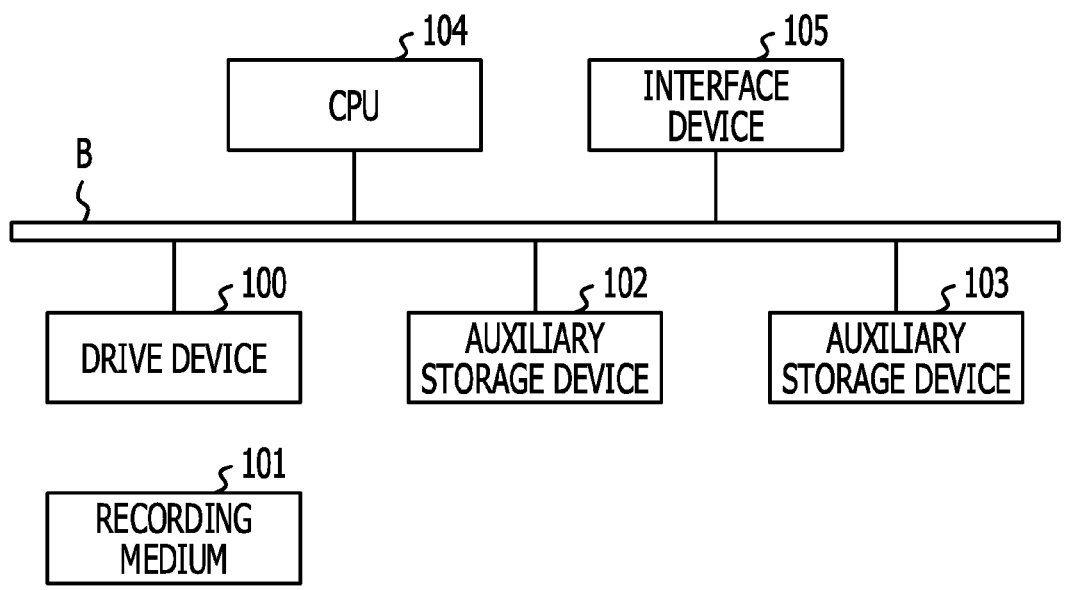
FIG. 1 is a diagram illustrating an exemplary hardware configuration of a staying point analysis apparatus according to an embodiment.

Hereinafter, the embodiment of the present technique is described with reference to the accompanying drawings. FIG. 1 is a diagram illustrating an exemplary hardware configuration of a staying point analysis apparatus according to the embodiment. A staying point analysis apparatus 10 illustrated in FIG. 1 includes a drive device 100, an auxiliary storage device 102, a memory device 103, a CPU 104, an interface device 105, and the like which are connected to one another by a bus B.

Programs which realize processes in the staying point analysis apparatus 10 are supplied from a recording medium 101. When the recording medium 101 in which the programs are stored is set to the drive device 100, the programs are installed in the auxiliary storage device 102 from the recording medium 101 through the drive device 100. The programs may be installed from the recording medium 101, or the programs may be downloaded from another computer through a network. The auxiliary storage device 102 stores appropriate files, data, and the like as well as the installed programs.

When the memory device 103 receives an instruction for activating the program, the memory device 103 reads a program from the auxiliary storage device 102 and stores the program. The CPU 104 executes a function of the staying point analysis apparatus 10 in accordance with the program stored in the memory device 103. The interface device 105 is used for connection to the network.

Examples of the recording medium 101 include a portable recording medium such as a CD-ROM, a DVD disc, or a USB memory. Furthermore, examples of the auxiliary storage device 102 include a hard disk drive (HDD) and a flash memory. Each of the recording medium 101 and the auxiliary storage device 102 is a computer readable recording medium.

Figure 2:
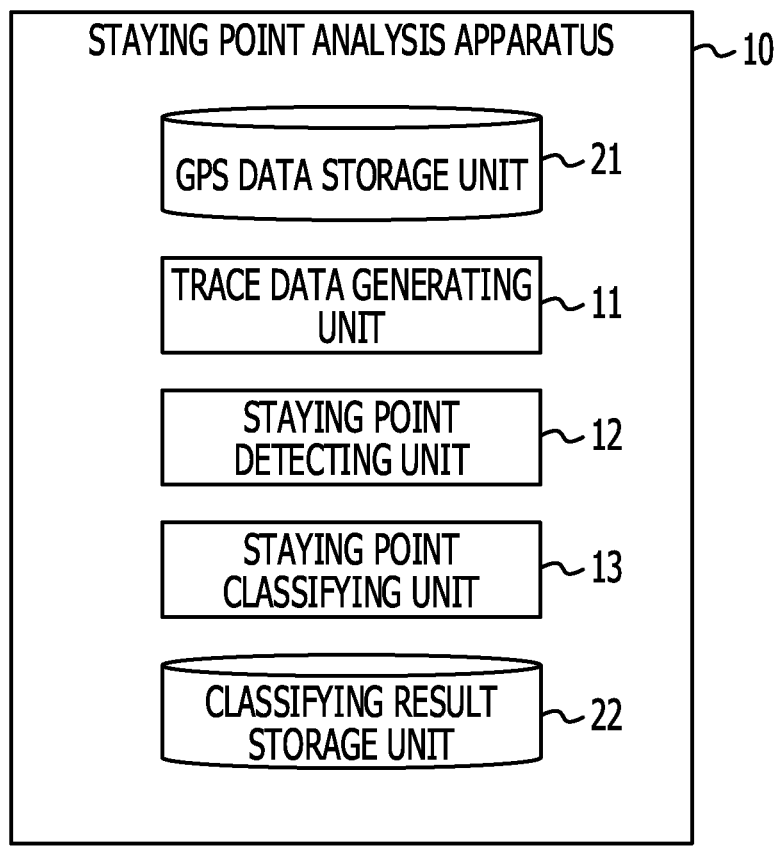
FIG. 2 is a diagram illustrating an exemplary functional configuration of the staying point analysis apparatus according to the embodiment.

FIG. 2 is a diagram illustrating an exemplary functional configuration of a staying point analysis apparatus according to the embodiment. In FIG. 2, the staying point analysis apparatus 10 includes a trace data generating unit 11, a staying point detecting unit 12, and a staying point classifying unit 13. The units are realized when the programs installed in the staying point analysis apparatus 10 cause the CPU 104 to execute processes. Furthermore, the staying point analysis apparatus 10 uses a GPS data storage unit 21, a classifying result storage unit 22, and the like. These storage units may be realized using the auxiliary storage device 102 or a storage device connected to the staying point analysis apparatus 10 through the network.

The GPS data storage unit 21 stores history of Global Positioning System (GPS) data including positional information and time information measured by a device such as a mobile terminal including a receiver disposed therein or a car-mounted device which moves with a mobile body. The GPS data storage unit 21 stores the history in association with identification information of each mobile body. Examples of the mobile body include a person and a vehicle. Note that, in this embodiment, a method for collecting GPS data is not limited to a certain method. For example, GPS data may be transmitted from a device including a GPS receiver (hereinafter referred to as a "GPS device") at regular time intervals. Alternatively, history of the GPS data obtained in a certain period of time may be collectively transmitted from a GPS device such as a GPS logger which is capable of storing history of GPS data.

The trace data generating unit 11 generates trace data representing a trajectory for each mobile body in accordance with GPS data.

The staying point detecting unit 12 detects a staying point of the mobile body in accordance with the trace data. The detection of staying point in accordance with the trace data may be performed by a method of the related art.

The staying point classifying unit 13 classifies the staying point detected by the staying point detecting unit 12 into one of a plurality of types in accordance with a certain index.

The classifying result storage unit 22 stores a result of the classification performed by the staying point classifying unit 13.

Figure 3:
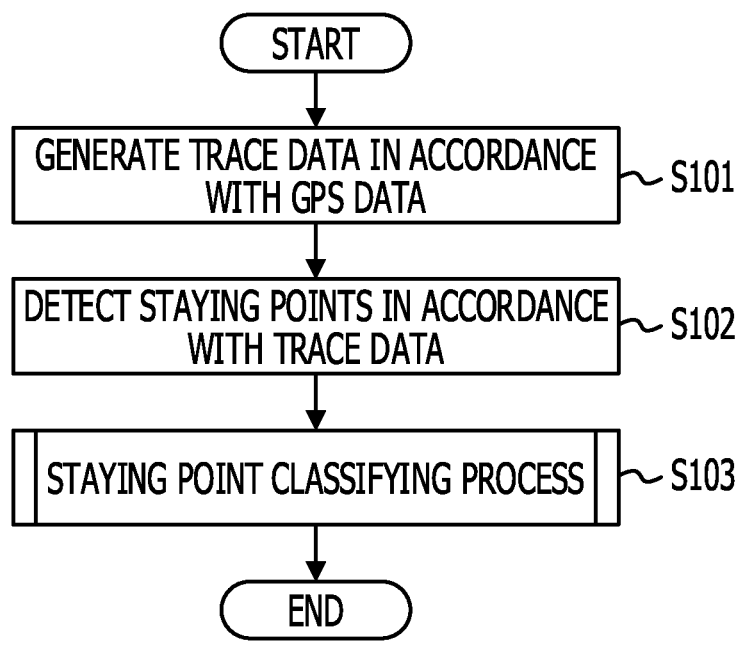
FIG. 3 is a flowchart illustrating an exemplary procedure executed by the staying point analysis apparatus.

Hereinafter, a procedure of a process performed by the staying point analysis apparatus 10 is described. FIG. 3 is a flowchart illustrating an exemplary procedure for a process executed by a staying point analysis apparatus.

In step S101, the trace data generating unit 11 generates trace data for each mobile body in accordance with GPS data stored in the GPS data storage unit 21.

FIG. 4 is a diagram illustrating an exemplary configuration of a GPS data storage unit. In FIG. 4, the GPS data storage unit 21 stores history of GPS data. The GPS data includes time, a mobile body ID, longitude, and latitude.

The time is measured, for example, when the GPS receiver included in the GPS device measures longitude and latitude. Alternatively, the time may be obtained based on time information included in a signal transmitted from a GPS satellite. The mobile body ID is identification information for each mobile body which has or accommodates the GPS device. The identification information of a GPS device may serve as the mobile body ID, for example. The longitude and the latitude represent a position of the mobile body at the time.

The trace data generating unit 11 generates, for each mobile body ID, trace data by arranging the latitude, the longitude, and the time of the GPS data as well as the mobile body ID in chronological order based on the time of the GPS data.

FIG. 5 is a diagram illustrating exemplary trace data. As illustrated in FIG. 5, the trace data is generated for each mobile body ID. The trace data includes groups each having latitude, longitude, and a time (hereinafter referred to as "position and time data") arranged in chronological order.

Figure 6:
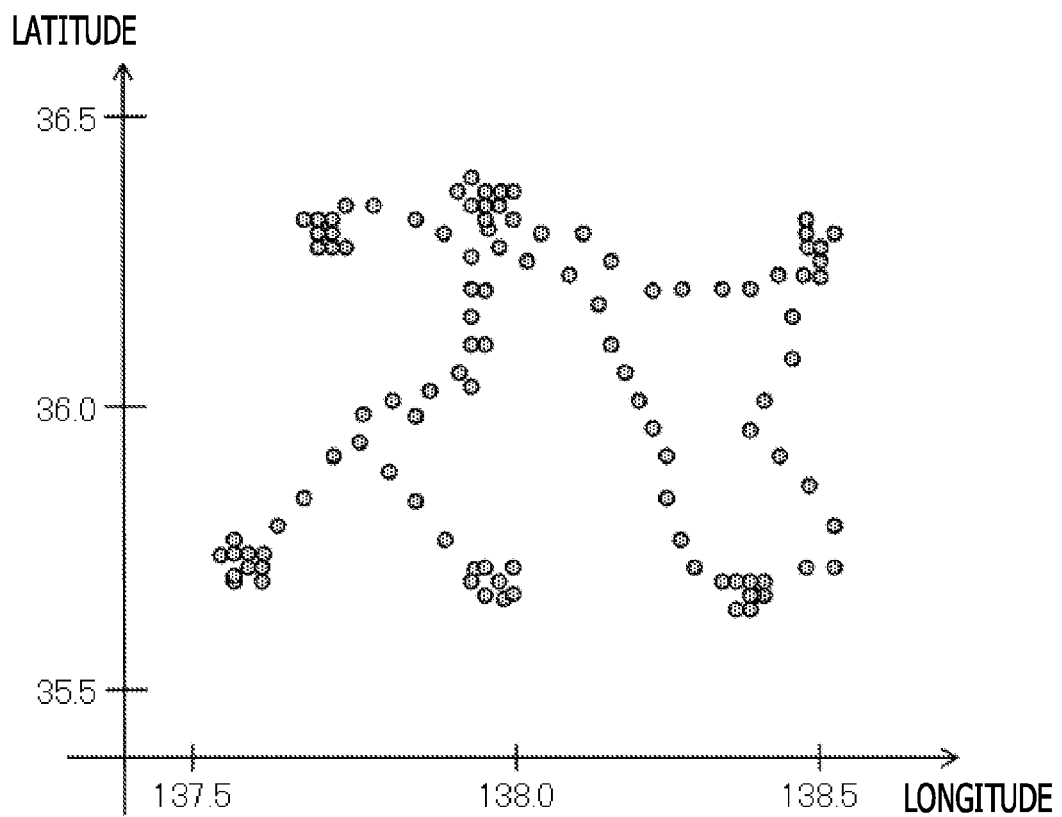
FIG. 6 is a diagram illustrating an exemplary trajectory obtained in accordance with the trace data.

According to the trace data, a trajectory, for example, as illustrated in FIG. 6 may be obtained for each mobile body.

FIG. 6 is a diagram illustrating an exemplary trajectory obtained in accordance with trace data. In FIG. 6, a trajectory obtained in accordance with trace data of a certain mobile body is illustrated. As illustrated in FIG. 6, the trace data represents the trajectory of the mobile body using a cluster of points plotted on a coordinate system of latitude and longitude, each point corresponding to position and time data included in the trace data. Note that, since the idea of time is not taken into account in FIG. 6, the time relationship among the points is not recognized. However, time is associated with the position and time data as well as the latitude and the longitude in practice as illustrated in FIG. 5, and therefore, the time relationship among the points (that is, a traveling direction), traveling timing, and the like may be recognized from the trace data.

Next, the staying point detecting unit 12 detects staying points for each trace data by analyzing the trace data (S102). The detection of staying points from the trace data may be performed using a method of the related art. When a traveling distance within a certain period of time is equal to or smaller than a certain value, for example, a center point of a trajectory within the certain period of time may be detected as a staying point. Any of the methods disclosed in Non-Patent Literatures 1 to 3 described above is applied, for example.

According to Non-Patent Literature 1, a staying point corresponds to a point or a place of stay in a certain range for a certain period of time or more, for example. According to Non-Patent Literature 3, a staying point corresponds to a point or a place representing high density of GPS data.

Figure 7:
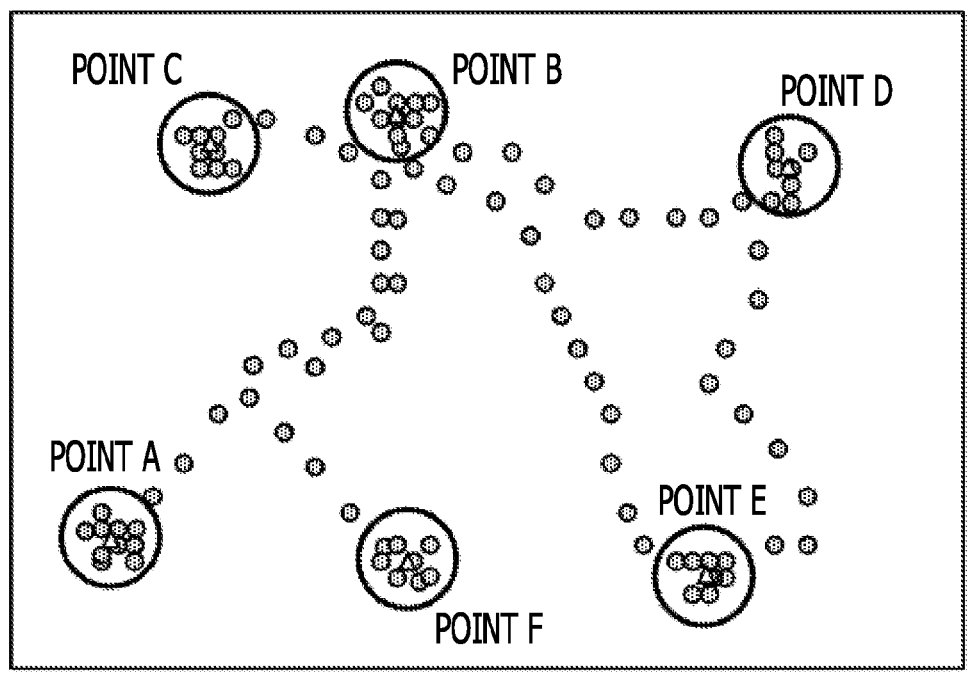
FIG. 7 is a diagram illustrating exemplary staying points detected in accordance with the trace data.

Staying points are detected as illustrated in FIG. 7, for example, in accordance with the trace data illustrated in FIG. 6.

FIG. 7 is a diagram illustrating exemplary staying points detected in accordance with the trace data. FIG. 7 illustrates an example in which six staying points, that is, points A to F are detected from single trace data. As illustrated in FIG. 7, a plurality of staying points may be detected for each trace data. Since the trace data includes an idea of time, a route of travel among the staying points is recognized as, for example, A→B→C→B→D→E→B→F→A. FIG. 7 illustrates a trajectory in a case where the point A corresponds to a home of the mobile body and the point B is an office of the mobile body. For example, FIG. 7 illustrates a trajectory obtained in a case where the mobile body leaves the point A corresponding to the home, goes to the point B corresponding to the office, has lunch in a restaurant in the point C, visits other offices in points D and E for business, goes back to the point B corresponding to the office, goes to a supermarket in the point F for shopping, and then goes back to the point A corresponding to the home.

Note that, in step S102, the detection of staying points as illustrated in FIG. 7 is performed for each trace data. Furthermore, in addition to the staying points, starting times (start timing) and ending times (end timing) of stay in the staying points are specified. When staying points are detected by the method disclosed in Non-Patent Literature 1, for example, the earliest time is set as a starting time and the latest time is set as an ending time among a cluster of the position and time data used for the detection of staying points.

Results of the detection of staying points are stored in the memory device 103 or the auxiliary storage device 102 in a form illustrated in FIG. 8, for example.

FIG. 8 is a diagram illustrating exemplary results of the detection of staying points. FIG. 8 illustrates an example in which a record including a mobile body ID, longitude, latitude, a starting time, and an ending time is stored for each staying point. The mobile body ID represents an ID of a mobile body which stayed in a staying point. The longitude and the latitude represent longitude and latitude of a detected staying point. The starting time represents a time of start of stay. The ending time represents a time of end of stay.

Note that, since a plurality of staying points may be detected in accordance with single trace data, a plurality of records having the same mobile body ID may be stored as results of the detection of staying points.

Thereafter, the staying point classifying unit 13 executes a staying point classifying process (S103). In the staying point classifying process, each of the staying points detected in step S102 is classified into a corresponding one of a plurality of types according to a certain index.

In this embodiment, the staying points are classified according to two indices, that is, a unique number and a simultaneous departure number.

A unique number of a certain staying point represents the number of mobile bodies which stayed in the staying point. The unique number is not represented as a total number. Specifically, even if the same mobile body stayed in the same staying point a plurality of times, a counted unique number of the mobile body for the staying point is 1. For example, it is highly likely that a staying point corresponding to a small unique number is a personal place such as a home or an office. It is highly likely that a staying point corresponding to a large unique number is a public place such as an intersection or a station. Note that a total number may be used instead of the unique number. In this case, the possibility of failure of determination may be increased since a total number in a place where a certain person frequently visits is increased. However, if such a situation is not expected, the total number may be used instead of the unique number.

The simultaneous departure number of a certain staying point represents the number of mobile bodies which nearly simultaneously leave the staying point. For example, in a passive staying point, that is, a staying point where people are forced to stay such as an intersection where people wait at a traffic light or a station where people wait for a train, many people nearly simultaneously leave the point. On the other hand, in an active staying point, that is, a staying point where mobile bodies optionally stay such as a shop, a restaurant, or a sightseeing spot, it is unlikely that the mobile bodies simultaneously leave. Note that a moment of departure from a staying point may correspond to a moment of end of stay in the staying point.

Figure 9:
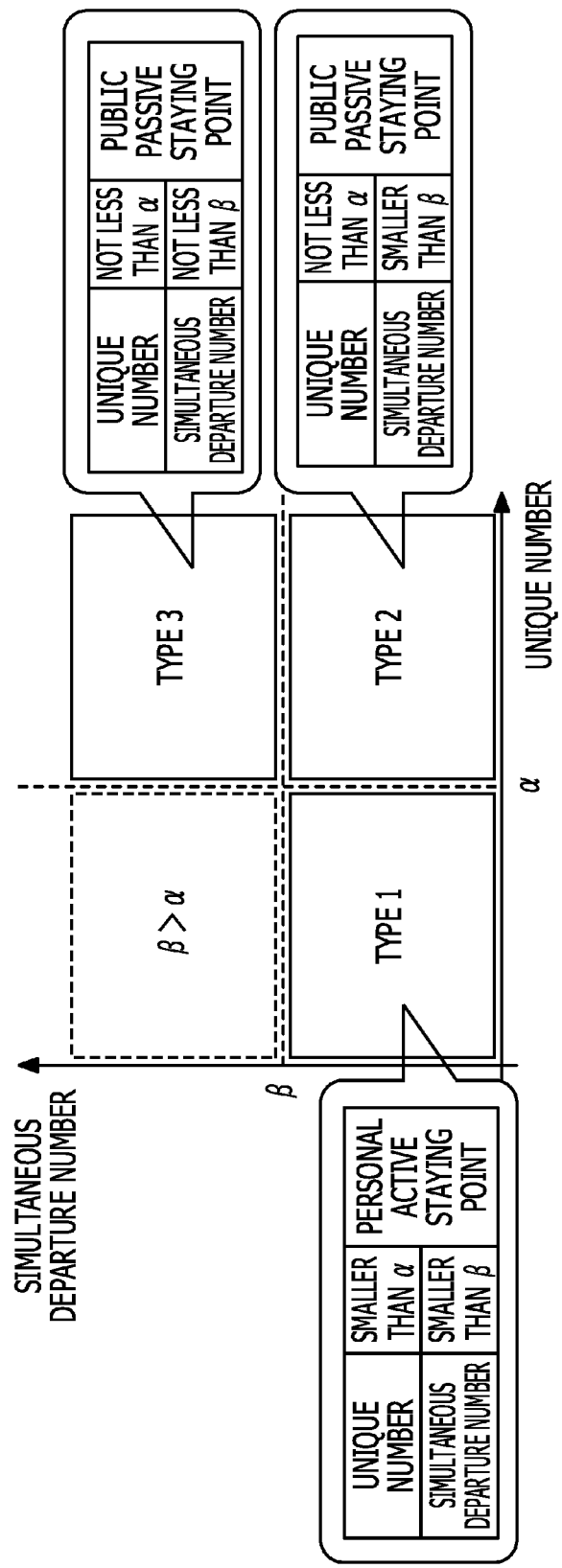
FIG. 9 is a diagram illustrating exemplary types of staying points classified according to a unique number and a simultaneous departure number.

In this embodiment, the staying points are classified into three types illustrated in FIG. 9 in accordance with the unique number and the simultaneous departure number.

FIG. 9 is a diagram illustrating exemplary types of staying points classified according to the unique number and the simultaneous departure number. In FIG. 9, $\alpha$ denotes a threshold between a large unique number and a small unique number. Furthermore, $\beta$ denotes a threshold between a large simultaneous departure number and a small simultaneous departure number. The meanings of $\alpha$ and $\beta$ are not changed hereinafter.

According to FIG. 9, staying points corresponding to the unique number smaller than $\alpha$ and the simultaneous departure number smaller than $\beta$ are classified into Type 1. Furthermore, staying points corresponding to the unique number equal to or larger than $\alpha$ and the simultaneous departure number smaller than $\beta$ are classified into Type 2. Moreover, staying points corresponding to the unique number equal to or larger than $\alpha$ and the simultaneous departure number equal to or larger than $\beta$ are classified into Type 3. Note that "$\beta>\alpha$" represents a state in which the number of mobile bodies which nearly simultaneously leave the staying point is larger than the number of mobile bodies which stayed in the staying point, and this state does not occur. Therefore, staying points are not classified into this region.

Examples of the staying points classified into Type 1 include personal active staying points such as homes and offices. Examples of the staying points classified into Type 2 include public active staying points such as sightseeing spots, shops, and restaurants. Examples of the staying points classified into Type 3 include public passive staying points such as intersections, stations, and heavy trafficked spots.

The unique number and the simultaneous departure number may be replaced by a rate of uniqueness and a rate of simultaneous departure. Calculations of the rate of uniqueness and the rate of simultaneous departure are described hereinafter. Furthermore, values of $\alpha$ and $\beta$ may be appropriately determined in accordance with the number of samples (the number of trace data), use of results of the classification, or the like.

Next, the staying point classifying process is described in detail. First, a functional configuration of the staying point classifying unit 13 which executes the staying point classifying process is described.

Figure 10:
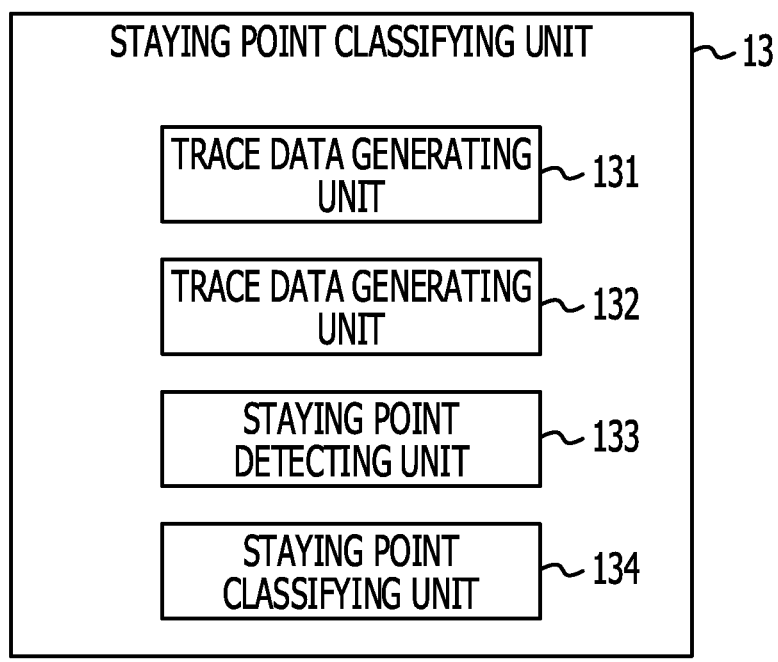
FIG. 10 is a diagram illustrating an exemplary functional configuration of a staying point classifying unit.

FIG. 10 is a diagram illustrating an exemplary functional configuration of a staying point classifying unit. In FIG. 10, the staying point classifying unit 13 includes a mesh generating unit 131, a unique number counting unit 132, a simultaneous departure number counting unit 133, and a type determining unit 134.

The mesh generating unit 131 divides a coordinate region including detected staying points by a mesh using longitude and latitude as coordinate axes. Regions divided by the mesh are referred to as "unit regions" hereinafter. The unique number counting unit 132 counts a unique number for each unit region. The simultaneous departure number counting unit 133 counts a simultaneous departure number for each unit region. The type determining unit 134 determines types of staying points included in a unit region for each unit region. Specifically, the staying points detected for each trace data are included in corresponding unit regions and determined as a staying point in each unit region.

Figure 11:
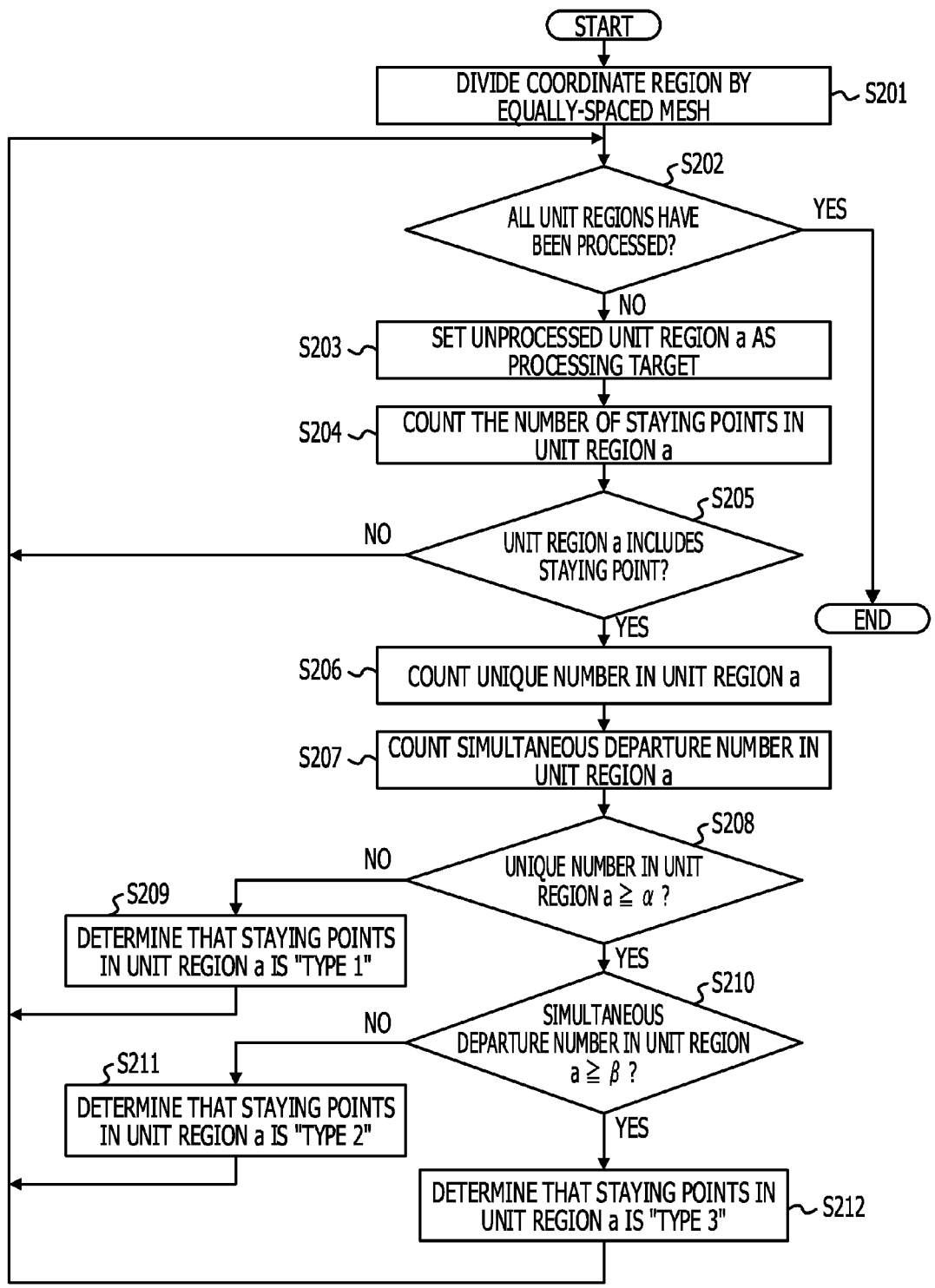
FIG. 11 is a flowchart illustrating an exemplary procedure of a staying point classifying process.

Hereinafter, a procedure performed by the staying point classifying unit 13 is described. FIG. 11 is a flowchart illustrating an exemplary procedure of a staying point classifying process.

In step S201, the mesh generating unit 131 divides a coordinate region including staying points detected in accordance with all trace data of processing targets by an equally-spaced mesh using longitude and latitude as coordinate axes.

Figure 12:
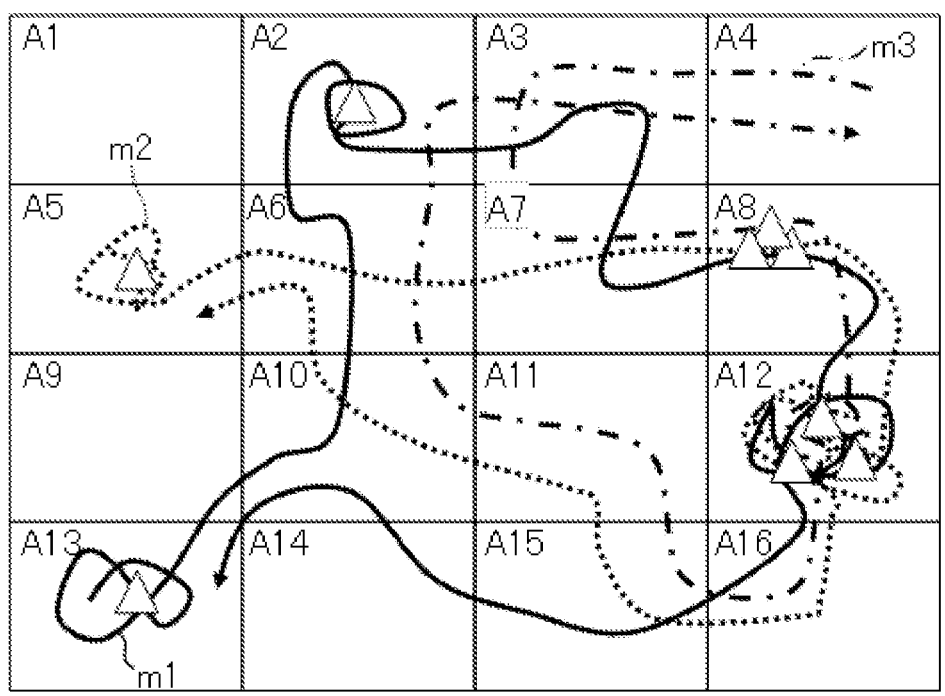
FIG. 12 is a diagram illustrating exemplary division of a coordinate region including trace data using an equally-spaced mesh.

FIG. 12 is a diagram illustrating exemplary division of a coordinate region including trace data using an equally-spaced mesh. FIG. 12 illustrates an example in which a coordinate region including three trace data, that is, trace data m1, trace data m2, and trace data m3, is divided by the equally-spaced mesh. As a result of the division, unit regions A1 to A16 are generated.

Note that spacing of the equally-spaced mesh is input as a parameter, for example. The spacing may be determined in accordance with use of results of classification of staying points, density of staying points to be classified, or the like. Furthermore, the mesh may not be equally spaced. For example, the spacing of the mesh may be fine in a region having high density of staying points.

Subsequently, the staying point classifying unit 13 determines whether all the unit regions have been processed (S202). When at least one of the unit regions has not been processed (NO in S202), the staying point classifying unit 13 determines one of the unprocessed unit regions as a processing target (hereinafter referred to as a "unit region a") (S203). Subsequently, the unique number counting unit 132 counts the number of staying points included in the unit region a (S204). Whether each of the staying points is included in the unit region a is determined in accordance with coordinate values of corners of the unit region a and latitude and longitude stored for individual staying points as illustrated in FIG. 8.

When the unit region a does not include a staying point (NO in S205), the process in step S202 onwards is executed. When the unit region a includes at least one staying point (YES in S205), the unique number counting unit 132 counts a unique number of the unit region a (S206). Basically, the unique number is obtained by counting the number of staying points included in the unit region a. However, when a plurality of staying points related to the same mobile body ID are included in the unit region a, the unique number for the plurality of staying points is 1. In this way, in this embodiment, the unique number is counted such that the staying points included in the same unit region represent the same place.

When the unit regions are obtained by the division as illustrated in FIG. 12, for example, results of counting of unique numbers of the unit regions A2, A5, A8, A12, and A13 are 1, 1, 3, 3, and 1, respectively.

Note that, when a rate of uniqueness is used instead of a unique number, the rate of uniqueness is obtained by dividing the unique number by the number of all trace data.

Subsequently, the simultaneous departure number counting unit 133 counts a simultaneous departure number for the staying points included in the unit region a (S207). Departure corresponds to an end of stay. Accordingly, the simultaneous departure number is counted in accordance with commonality or proximity of stored ending times of the staying points included in the unit region a. Specifically, the simultaneous departure number counting unit 133 compares the ending times of the staying points included in the unit region a with one another and counts the number of staying points having ending times included in a certain period of time. With respect to the certain period of time, a period of time considered as almost the same time when a traveling speed or the like of a mobile body is taken into account may be set as a parameter.

Figure 13A:
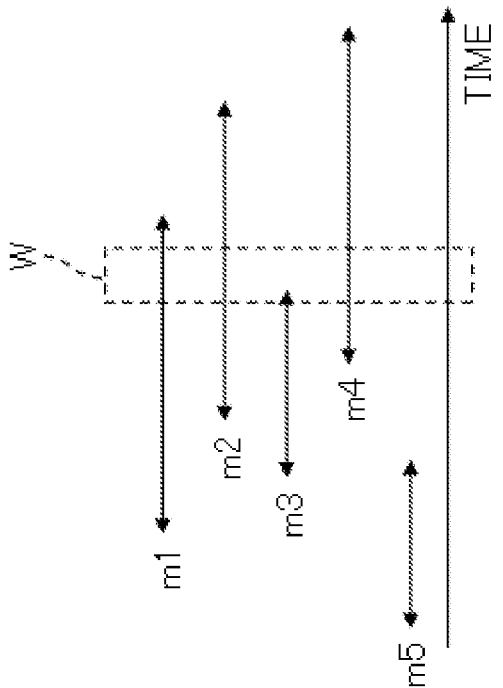
FIGS. 13A and 13B are diagrams for describing a method for counting the simultaneous departure number.
Figure 13B:
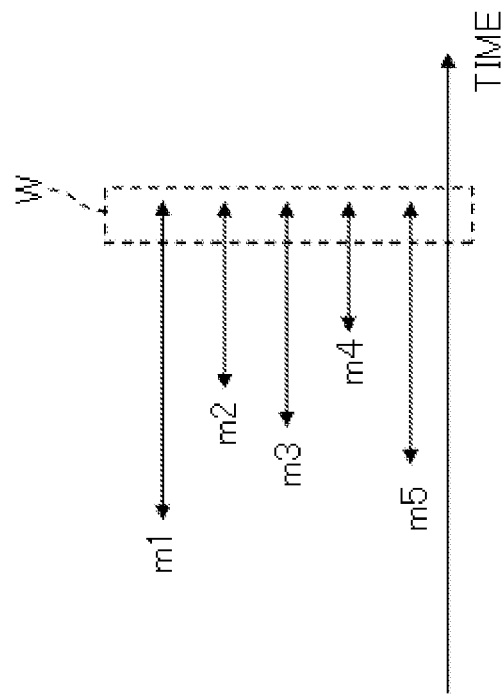

FIGS. 13A and 13B are diagrams for describing a method for counting the simultaneous departure number. In FIGS. 13A and 13B, double-headed arrows represent lengths of stay in the staying points (for individual mobile bodies) in a certain unit region. The length of stay represents a period of time from a starting time to an ending time in a staying point of interest. Here, m1 to m5 denote mobile body IDs.

FIG. 13A is a diagram illustrating a case where ending times (that is, departure times) of all the mobile bodies m1 to m5 are almost the same. A rectangle W illustrated in FIG. 13A denotes a virtual window representing a same-timing range. In FIG. 13A, the ending times of all the mobile bodies (all the staying points) are included in the window W. Therefore, a result of counting of a simultaneous departure number in FIG. 13A is 5.

On the other hand, in FIG. 13B, the window W does not simultaneously include a plurality of departure times even if the window W is shifted to any time point. Therefore, in this case, a result of counting of a simultaneous departure number is 0.

Note that, when a rate of simultaneous departure is used instead of the simultaneous departure number, the rate of simultaneous departure may be obtained by dividing a simultaneous departure number counted for the unit region a by the number of staying points included in the unit region a.

Subsequently, the type determining unit 134 determines whether the unique number of the unit region a is equal to or larger than the threshold $\alpha$ (S208). When the unique number of the unit region a is smaller than the threshold $\alpha$ (NO in S208), the staying point classifying unit 13 determines that a type of the staying points included in the unit region a is "Type 1" (S209). For example, the type determining unit 134 calculates an average value (center of gravity) of latitudes and longitudes of all the staying points included in the unit region a and sets a result of the calculation as a representative position of the staying points. The type determining unit 134 associates a value representing "Type 1" with the representative position and stores the value in the classifying result storage unit 22. Therefore, the classifying result storage unit 22 stores records of individual unit regions.

Figure 14:
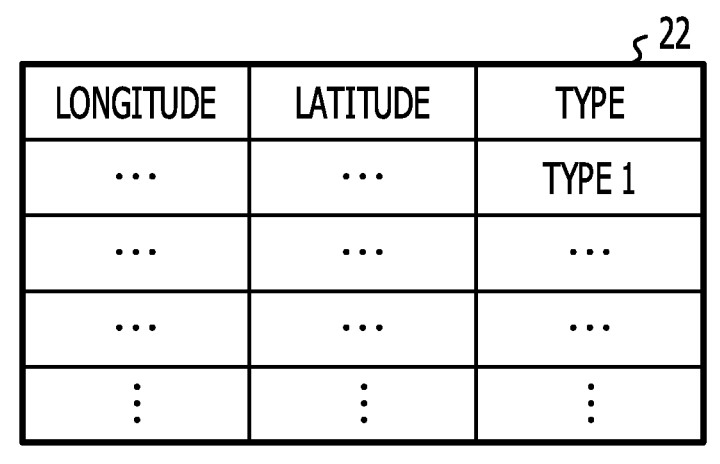

FIG. 14 is a diagram illustrating an exemplary configuration of a classifying result storage unit. In FIG. 14, individual records stored in the classifying result storage unit 22 include latitude, longitude, and a type.

The latitude and the longitude represent those of a representative position of staying points included in a unit region corresponding to a record of interest. The type represents a type of a staying point represented by the latitude and the longitude. It is highly likely that the representative position is a representative position regarding a single staying place. Specifically, staying positions detected as the same place in accordance with trace data of mobile bodies may be different from one another. If spacing of a mesh is appropriately set, such differences may be reduced, and the different staying positions may be used as the same place.

On the other hand, when the unique number of the unit region a is equal to or larger than the threshold $\alpha$ (YES in S208), the type determining unit 134 determines whether the simultaneous departure number of the unit region a is equal to or larger than the threshold $\beta$ (S210). Note that the thresholds $\alpha$ and $\beta$ are input as parameters, for example.

When the simultaneous departure number of the unit region a is smaller than the threshold $\beta$ (NO in S210), the type determining unit 134 determines that a type of the staying points included in the unit region a is "Type 2" (S211). Specifically, the type determining unit 134 associates a value corresponding to "Type 2" with latitude and longitude of the representative position for all the staying points included in the unit region a and stores the value in the classifying result storage unit 22.

On the other hand, when the unique number of the unit region a is equal to or larger than the threshold $\beta$ (YES in S210), the type determining unit 134 determines that a type of the staying points included in the unit region a is "Type 3" (S212). Specifically, the type determining unit 134 associates a value corresponding to "Type 3" with latitude and longitude of the representative position for all the staying points included in the unit region a and stores the value in the classifying result storage unit 22.

Note that the classifying result storage unit 22 may store records for individual staying points instead of individual unit regions. In this case, the same value of a type may be assigned to staying points included in the same unit region. However, it is highly possible that data is more easily utilized by a user when a result of classification is output for each unit region as illustrated in this embodiment. This is because, as described above, it is highly likely that a plurality of staying points included in a single unit region represent the same place.

As described above, according to this embodiment, types of staying points may be classified according to indices of the unique number and the simultaneous departure number. Accordingly, processes such as matching with a map may be omitted and classification of types of staying points may be simplified.

Furthermore, since the staying points are classified into Types 1 to 3, staying points that are not used may be easily excluded from analysis targets in accordance with an object of analysis using a classification result, or the like.

For example, when a place where tourists visit in a certain region is to be analyzed, places classified into Type 2 are set as analysis targets. By this, personal places such as homes and offices and places where people are forced to stay such as intersections and stations may be excluded from the analysis targets. Specifically, possibility of false detection of homes, offices, intersections, and stations as popular sightseeing spots may be reduced.

On the other hand, when a state in which people are waiting in intersections, stations, or the like is to be analyzed, places classified into Type 3 are set as analysis targets. By this, personal places such as homes and offices, shops, restaurants, sightseeing spots, and the like may be excluded from the analysis targets.

Note that, although classification of staying points using both of the unique number and the simultaneous departure number is taken as an example in this embodiment, the staying points may be classified using one of the unique number and the simultaneous departure number depending on use of a result of the classification. For example, when the classification is performed using the unique number, the staying points may be classified into a personal place or a public place. When the classification is performed using the simultaneous departure number, the staying points may be classified into an active place or a passive place.

Furthermore, a plurality of thresholds may be used for the unique number and the simultaneous departure number. Alternatively, the staying points may be classified using a distance function.

Figure 15A:
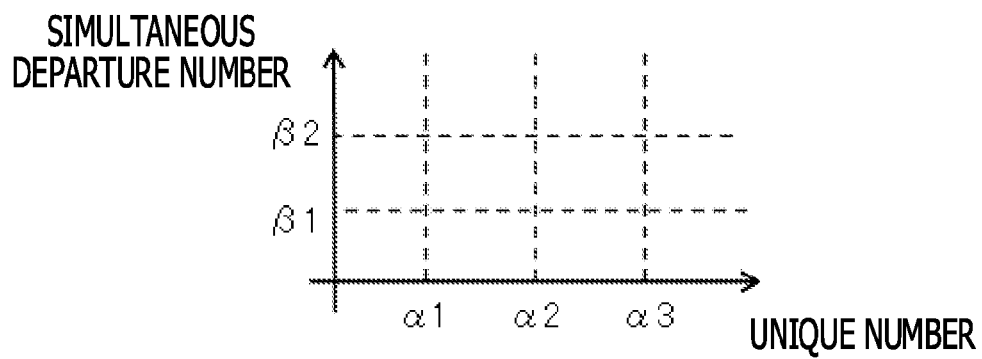
FIGS. 15A and 15B are diagrams illustrating modifications of an analysis method.
Figure 15B:
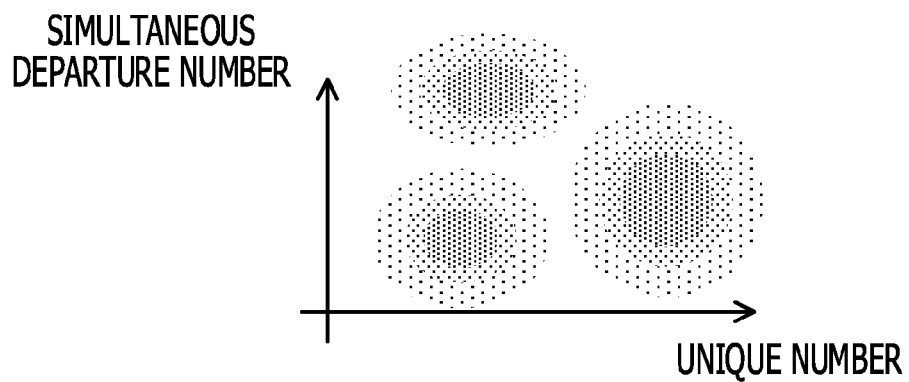

FIGS. 15A and 15B are diagrams illustrating modifications of the classifying method. FIG. 15A is a diagram illustrating a case where a plurality of thresholds are set for the unique number and the simultaneous departure number. FIG. 15B is a diagram illustrating a case where the staying points are classified using a distance function.

Note that, in this embodiment, the simultaneous departure number counting unit 133 is an example of a comparison unit. The type determining unit 134 is an example of a determination unit.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An analysis method executed by a computer, the analysis method comprising:
    acquiring a plurality of trace data indicating where and when a plurality of communication devices existed respectively, the plurality of communication devices moving with a plurality of moving bodies;
    identifying one or more staying points based on the plurality of trace data, each of the staying points corresponding to a place where one of the communication devices stayed for a certain time period;
    determining a unique number and a simultaneous departure number for each of the identified staying points, the unique number representing a number of different communication devices among the plurality of communication devices that stayed at the staying point and the simultaneous departure number representing a number of communication devices among the plurality of communication devices that simultaneously depart the staying point; and
    categorizing the one or more staying points into any one of categories in accordance with the determined unique number and simultaneous departure number, the categories indicating, respectively, features regarding the place.

2. The analysis method according to claim 1, further comprising:
    counting a number of the communication devices that have stayed at a specific staying point for a certain time period,
    wherein the categorizing is executed in accordance with the number.

3. The analysis method according to claim 2,
    wherein, when the number is more than a threshold, the specific staying point is categorized into a category indicating the place has a feature that the plurality of moving bodies more than the threshold is stopped by.

4. An analysis method executed by a computer, the analysis method comprising:
    acquiring a plurality of trace data indicating where and when a plurality of communication devices existed respectively, the plurality of communication devices moving with a plurality of moving bodies;
    identifying one or more staying points based on the plurality of trace data, each of the staying points corresponding to a place where one of the communication devices stayed for a certain time period;
    determining a unique number and a simultaneous departure number for each of the identified staying points, the unique number representing a number of different communication devices among the plurality of communication devices that stayed at the staying point and the simultaneous departure number representing a number of communication devices among the plurality of communication devices that simultaneously depart the staying point; and
    categorizing the one or more staying points into any one of categories in accordance with the determined unique number and simultaneous departure number, the categories indicating, respectively, features regarding the place.

5. An analysis apparatus comprising:
a memory; and
a processor coupled to the memory and configured to:
- acquire a plurality of trace data indicating where and when a plurality of communication devices existed respectively, the plurality of communication devices moving with a plurality of moving bodies,
- identify one or more staying points based on the plurality of trace data, each of the staying points corresponding to a place where one of the communication devices stayed for a certain time period,
- determine a unique number and a simultaneous departure number for each of the identified staying points, the unique number representing a number of different communication devices among the plurality of communication devices that stayed at the staying point and the simultaneous departure number representing a number of communication devices among the plurality of communication devices that simultaneously depart the staying point, and
- categorize the one or more staying points into any one of categories in accordance with the determined unique number and simultaneous departure number, the categories indicating, respectively, features regarding the place.

6. The analysis apparatus according to claim 5, wherein the processor is further configured to count a number of the communication devices that have stayed at a specific staying point for a certain time period, and to categorize in accordance with the number.

7. The analysis apparatus according to claim 6,
wherein, when the number is more than a threshold, the specific point is categorized into a category indicating the place has a feature that the plurality of moving bodies more than the threshold is stopped by.

* * * * *